Sept. 6, 1932.  F. M. FORBES  1,875,717
BRAKE
Filed July 9, 1930  2 Sheets-Sheet 1
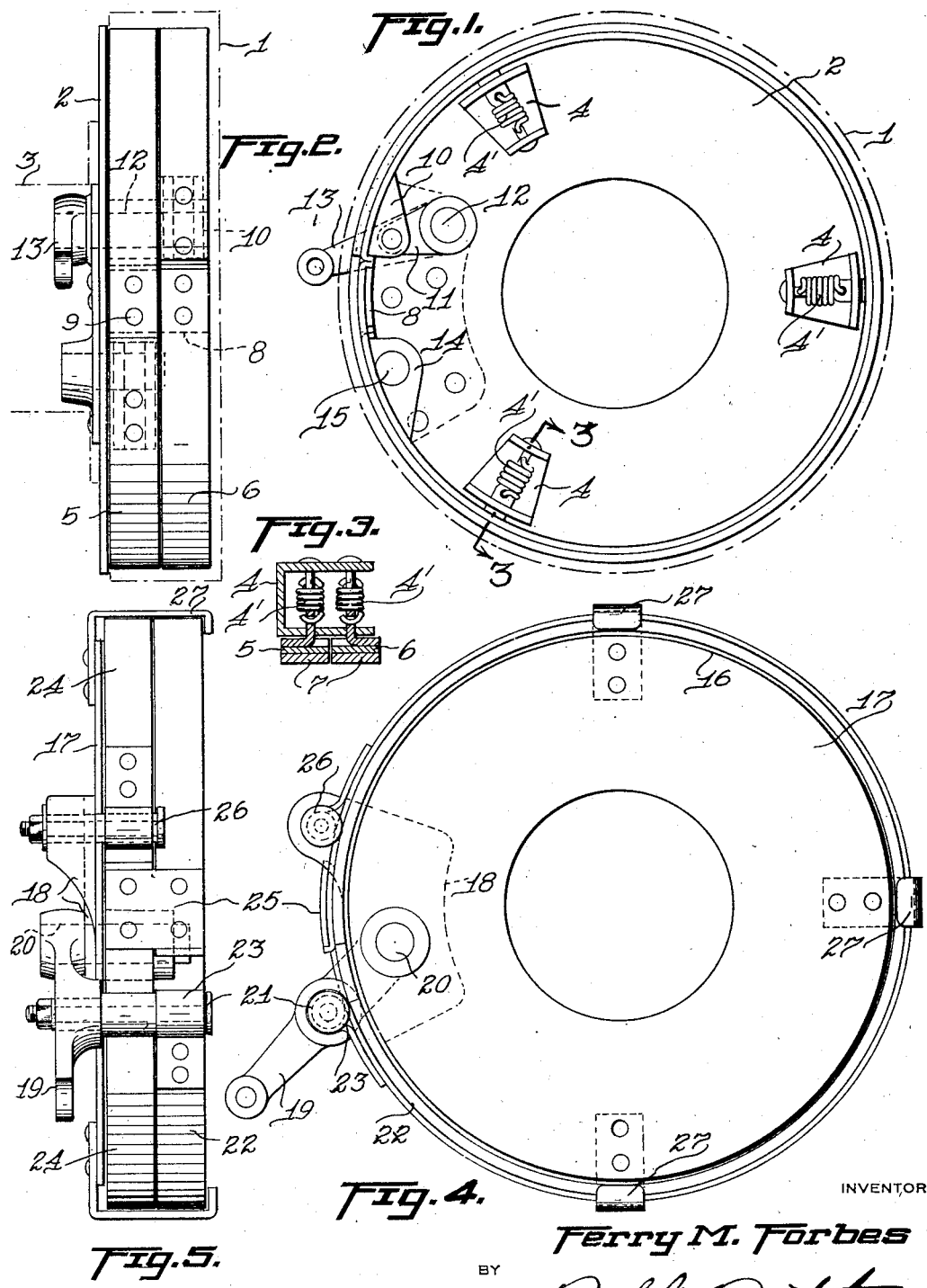
INVENTOR
Ferry M. Forbes
BY
ATTORNEYS Sept. 6, 1932.  F. M. FORBES  1,875,717
BRAKE
Filed July 9, 1930  2 Sheets-Sheet 2
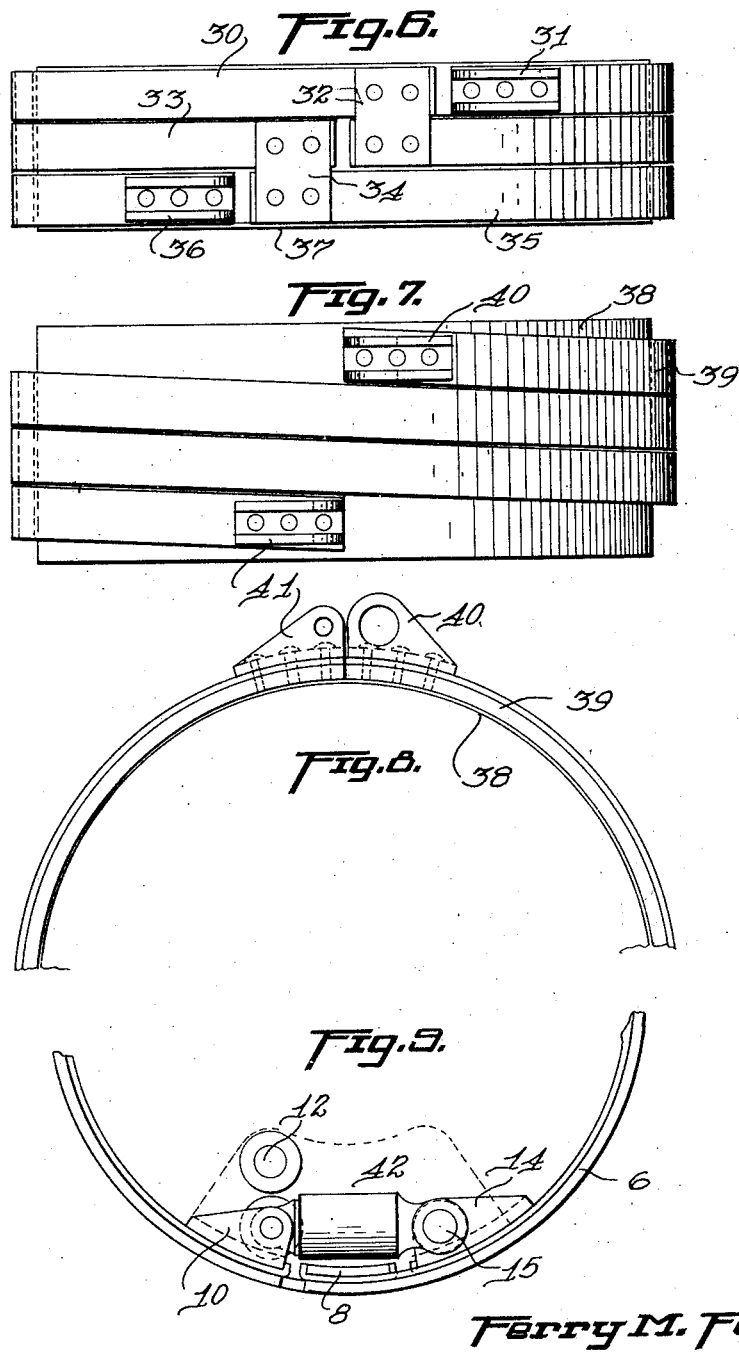

Patented Sept. 6, 1932

1,875,717

UNITED STATES PATENT OFFICE

FERRY M. FORBES, OF DETROIT, MICHIGAN

BRAKE

Application filed July 9, 1930. Serial No. 466,682.

The present invention pertains to a novel brake of a type particularly adapted for use in the automobile field as a medium for decreasing the speed or stopping the vehicle or it may advantageously be employed as a friction clutch for other machinery to establish a driving connection between a drum and shaft.

The primary object of the present invention is to devise a brake including, among other things, bands mounted to prevent or retard rotation of a drum by absorbing the rotative energy when they are applied to the surface of the drum to create frictional resistance therebetween. The friction braking bands are applied to the drum in a manner whereby the resistance is distributed over a comparatively large surface of which the area is great enough to prevent undue wear or heating of the parts which come in frictional contact.

With the above and other ends in view the invention consists in the matters hereinafter set forth and more particularly pointed out in the appended claims, reference being had to the accompanying drawings, in which Figure 1 is a side elevation of brake constructed in accordance with the present invention;

Fig. 2 is an end view thereof;

Fig. 3 is a cross sectional view taken on the line 3—3 of Fig. 1;

Fig. 4 is a side elevation illustrating the brake bands on the outer surface of the brake drum;

Fig. 5 is an end view thereof;

Fig. 6 illustrates the manner in which the present invention provides for a plurality of sectional brake bands;

Fig. 7 illustrates the manner in which the present invention provides for a multiple winding of the brake band;

Fig. 8 is a fragmentary side elevation in direct projection of Fig. 7, and

Fig. 9 illustrates the manner in which hydraulic means may be utilized to operate the expanding type of brake illustrated in Figs. 1 and 2.

Like characters of reference are employed throughout to designate the corresponding parts.

In Figs. 1, 2 and 3 there is illustrated a form of the present invention which comprises a braking unit adapted to be supported within a brake drum mounted on a wheel in the usual manner known to the trade. The brake drum is shown in broken lines and is indicated by the numeral 1, there being a flat circular disk 2 mounted upon the axle housing 3 adjacent the brake drum 1.

Brackets 4 are secured to the face of the disk 2 to project into the drum 1 and are provided with springs 4' to support a pair of brake banks 5 and 6 upon which the usual brake lining 7 is secured. One end of the band 5 has a plate 8 riveted thereto as at 9 and the opposite end of the plate 8 is riveted to one end of the band 6 as indicated by the numeral 9. The opposite end of the band 5 is provided with a bracket 10 to which is pivoted an arm 11 that is mounted upon a stub shaft 12 that is rotatably mounted in the disk 2, an operating lever 13 being mounted upon the outer end of the shaft 12 to provide a means of connection whereby the shaft 12 may be rotated by the usual foot operated brake pedals. The opposite end of the band 6 is provided with a bracket 14 carrying a stub shaft 15 which has its opposite end journalled in the disk 2.

In operation the lever 13 rotates the shaft 12 and the arm 11 forces the bracket 10 upwardly tending to force the band 5 to rotate and the link 8 causes the same tendency in regard to the band 6 which is anchored to the disk 2 at its opposite end by the stub shaft 15. The anchoring of the band 6 causes both bands to be forced outwardly into contact with the drum and in this manner the braking pressure is distributed over two complete revolutions of the bands.

In Figs. 4 and 5 the numeral 16 indicates a brake drum which is adapted to be attached to an automobile wheel and the numeral 17 indicates a flat circular disk which is adapted to be mounted upon the axle housing. A plate 18 is secured to the outer face of the disk and an operating lever 19 is pivotally mounted upon this plate by a pin 20 which passes through the plate and disk. The operating lever supports a stub shaft 21 which projects outwardly over the drum and a brake band 22 has one end looped thereover as at 23. The band 22 encircles the drum 16 and has its opposite end secured to one end of the brake band 24 which encircles the drum parallel to the band 22, a link or plate 25 being rivetted to the ends of the bands to provide the connection means. The free end of the band 24 is looped around a bolt 26 which is carried by the plate 18 and clips 27 are secured to the disk 17 at intervals to maintain the bands 22 and 24 on the drum when the bands are loose.

To tighten the bands the lever 19 is moved in a suitable direction to draw the band 22 around the drum in the desired direction. The movement of the band 22 also draws the band 24 in the same direction as a result of the connection by the plate 25 and because the band 24 is anchored on the rigid bolt 26 it cannot move after it comes tightly in contact with the drum. In this manner both bands 22 and 24, which comprise two convolutions around the drum 16, both become tight at the same time and thereby the braking pressure and resistance is distributed over two convolutions or revolutions around the drum.

In Fig. 6 is illustrated the manner in which the present invention provides for further increase in the number of convolutions of the brake bands around the drum. In this form there is provided a brake band 30 having a bracket 31 secured to one end thereof and a plate 32 rivetted to the other. A brake band 33 has one end rivetted to the plate 32 and its opposite end rivetted to a plate 34. A third band 35 has one end rivetted to the plate 34 and its opposite end supporting the bracket 36.

In this form one or other of the brackets 31 and 36 are anchored and we will assume that the bracket 31 is anchored to a disk supported by the axle housing. The bracket 36 is then moved in a clockwise direction and all three bands 30, 33 and 35 are tightened around the surface of the drum 37 and in this manner the braking friction is distributed over three convolutions of the brake bands around the drum.

In Fig. 7 there is illustrated a brake drum 38 around which is wound a brake band 39 having brackets 40 and 41 on each end thereof. The helical convolutions of the band around the drum are drawn tight by anchoring the bracket 40 and moving the bracket 41 in the proper direction and the plurality of convolutions of the brake band distributes the braking friction and pressure over three revolutions or convolutions around the brake drum.

In Fig. 9 there is illustrated an hydraulic cylinder 42 which is interposed between the brackets 10 and 14 illustrated and described in reference to Figs. 1 and 2, illustrating the application of the present brake bands to hydraulic brakes as well as the manually operated types.

Although specific embodiments of the present invention have been illustrated and described it is to be understood that various changes may be made in the details of construction without departing from the spirit of the invention, to adapt the brake to machinery other than motor cars, and such changes are contemplated.

What I claim is:—

1. A brake band comprising a plurality of sections forming convolutions around a brake drum, a bracket mounted on one end of one of said sections to anchor it relative to said drum, a bracket mounted on one of said sections to accommodate means for drawing said section around said drum, and plates interconnecting said sections whereby said drawing movement causes said sections to come in frictional contact with said drum.

2. A brake band comprising a plurality of sections forming convolutions around a brake drum, a bracket mounted on one end of one of said sections to anchor it relative to said drum, a bracket mounted on one of said sections to accommodate means for forcing said section into contact with said drum, and plates interconnecting said sections whereby said pressure of said section against said drum is equally distributed to all of said section.

In testimony whereof I affix my signature.

FERRY M. FORBES.